United States Patent [19]

Leach

[11] 3,906,992

[45] Sept. 23, 1975

[54] SEALED, EASILY CLEANABLE GATE VALVE

[76] Inventor: John Meredith Leach, P.O. Box 341, Port Jefferson, N.Y. 11777

[22] Filed: July 2, 1974

[21] Appl. No.: 485,108

[52] U.S. Cl. .............. 137/315; 251/327; 251/328; 251/329; 251/214; 251/203
[51] Int. Cl.² .......................................... F16K 3/14
[58] Field of Search .......... 251/327, 328, 329, 214; 137/315

[56] References Cited
UNITED STATES PATENTS

| | | | |
|---|---|---|---|
| 2,893,684 | 7/1959 | Williams | 251/329 X |
| 2,913,220 | 11/1959 | Cover | 251/328 |
| 3,000,608 | 9/1961 | Williams | 251/329 X |
| 3,433,349 | 3/1969 | Leach | 251/328 X |
| 3,710,816 | 1/1973 | Prince | 251/328 X |

FOREIGN PATENTS OR APPLICATIONS

| | | | |
|---|---|---|---|
| 1,550,587 | 10/1969 | Germany | 251/328 |

Primary Examiner—Alan Cohan

[57] ABSTRACT

A gate valve including quickly, easily replaceable seals to prevent material from building up between the gate plate and its slideway and jamming the plate against movement. The seals are held against the plate under a controlled pressure and the pressure creating components are quickly removable for the purposes of replacing the seals and thoroughly cleaning the gate and its guides while the seals are removed.

3 Claims, 2 Drawing Figures

SEALED, EASILY CLEANABLE GATE VALVE

BACKGROUND OF THE INVENTION

This invention relates to gate valves of the type wherein a gate is movable back and forth in a thruway in a body member through which material flows in order to obstruct and stop the material flow when desired.

Such valves have given much trouble in the past because the material being controlled would gradually build up between the gate and its guideway and impede and possibly stop all movement of the gate in the guideway.

The type of this invention is best exemplified by U.S. Pat. No. 3,433,349 on which the present invention is an improvement. All of the objects and advantages of the invention states in that patent apply with equal force and accuracy to the present invention.

SUMMARY OF THE INVENTION

In order to prevent the build-up of material between a gate valve plate and its guideway the guideway is formed, preferably top and bottom, of a packing and sealing strip on which the gate plate floats and thus seals against invasion of material between the plate and its guideway very thoroughly. The sealing and packing strips are pressed against the gate plate under controlled pressure and are wear resistant and the gate plate is preferably formed of wear resistant material.

The components which provide the controlled pressure against the sealing strip are quickly removable to provide quick access to the sealing strip to replace it and also clean the guideway and the gate plate is also quickly removable from the guideway so that it can be thoroughly cleaned.

The objects of the present invention are to provide a gate valve having all of the advantages above described. Other objects and advantages will become apparent to a person skilled in the art upon recourse to the following specification.

BRIEF DESCRIPTION OF THE DRAWINGS

The now preferred embodiment of the invention is disclosed in the accompanying drawings which are to be considered as descriptive and not limitative as many changes and modifications can be made in the structural details without departing from the spirit of the invention.

In the drawings.

Figure 1:
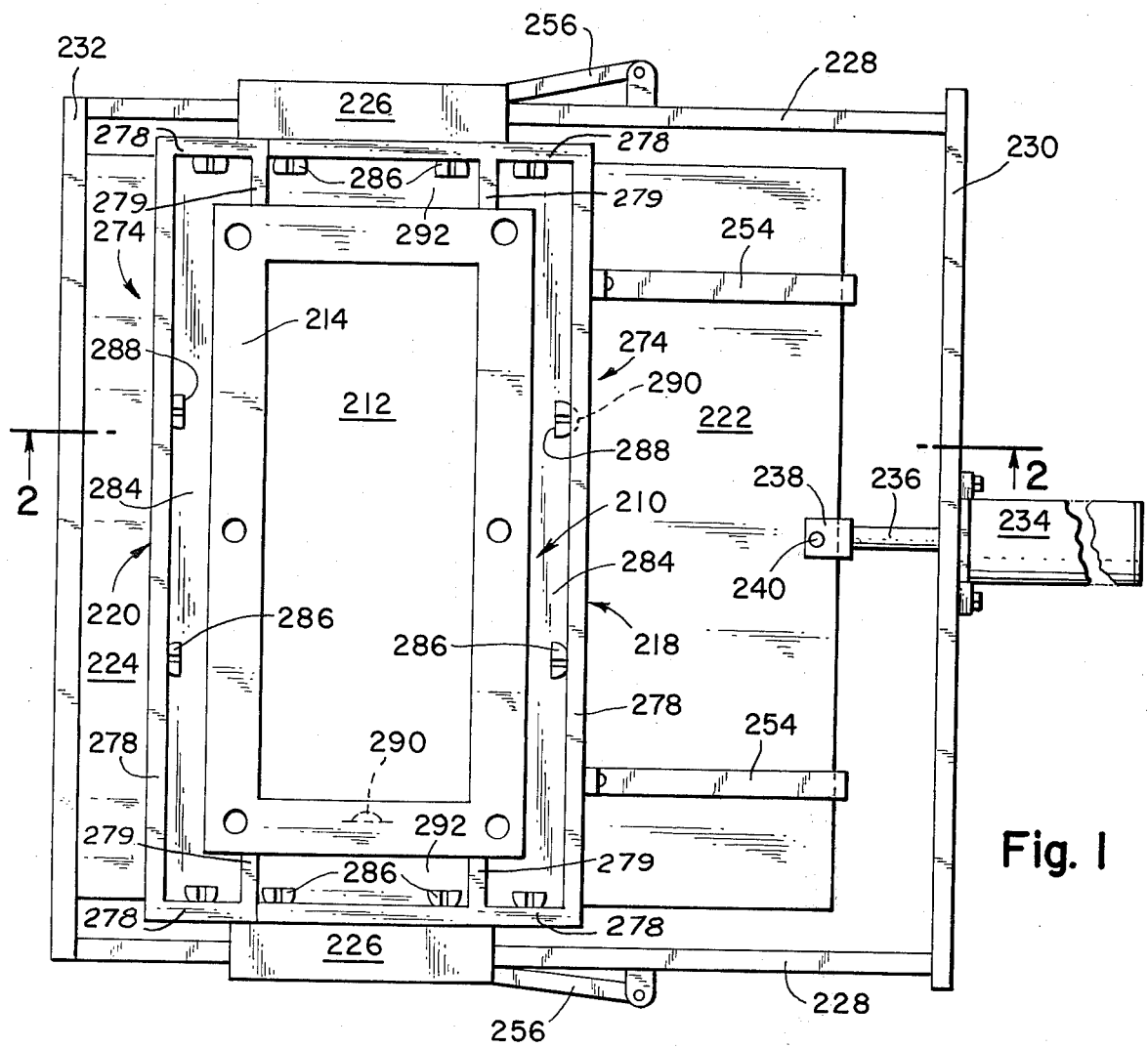
FIG. 1 is a top plan view of a gate valve made in accordance with the prsent invention.
Figure 2:
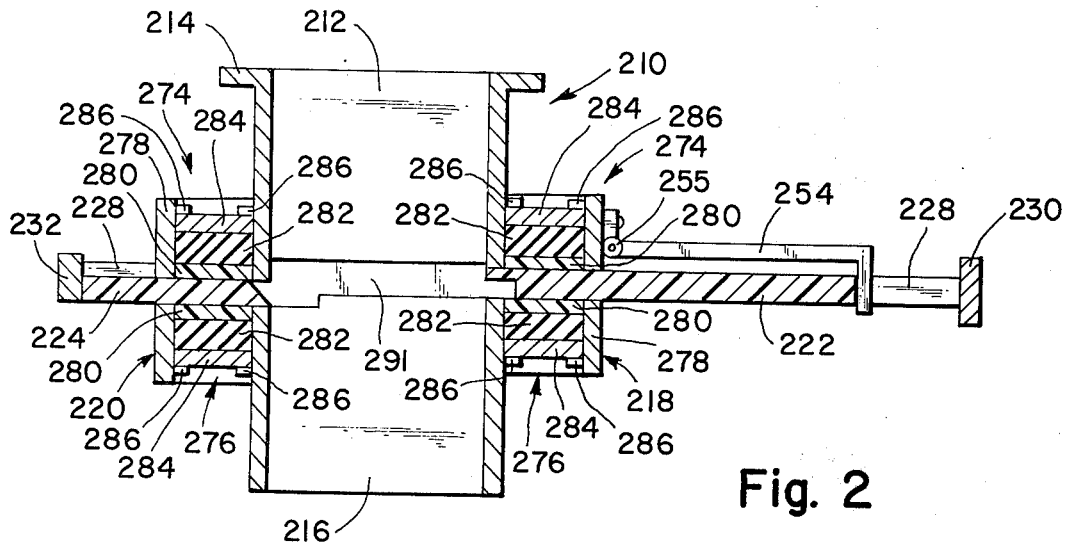
FIG. 2 is a cross sectional view of the valve of FIG. 1 taken substantially on a plane indicated by line 2 — 2 of FIG. 1 and looking in the direction of the arrows.

The same reference characters will be used to identify components of the present invention as were used to identify corresponding components of the invention disclosed in U.S. Pat. No. 3,433,349. The gate valve of the present invention comprises a homogenous body 210 having an inlet opening 212 provided with a bolting flange 214 and an outlet opening 216. The two openings 212 and 216 form a throughway in the body.

Two slideways 218 and 220 are provided in the body 210 on opposite sides of the thruway. Each of the slideways comprises indentical top and bottom assemblies 274 and 276. Each assembly comprises a wall 278 spaced from the wall of the thruway, and other elements to be described later.

A plate 222 is slidable backward and forward in the slideway 218 and a plate 224 is slidable backward and forward in the slideway 220. These two plates can be made of any desired material, metallic or plastic, but polyethylene is preferred because it is not affected by most materials, has a low coefficient of friction, most materials do not adhere to it and it is approved by most regulatory agencies. A slide guide 226 is suitably attached to each end of the body 210 and each supports a slide 228 which is suitably attached at one end to a crosspiece 230 and at the opposite end to a crosspiece 232 which is suitably connected directly to the plate 224. The cross-piece 230 carries a suitable force exerting mechanism such as a conventional double acting air cylinder 234 which has a rod 236 connected to a clevis 238 which is pivotably connectd as at 240 to the plate 222. The cylinder 234 is connected to any desired source of air pressure by hoses and control valves not shown. Two stops 254 suitably attached to the wall 278 normally limit the outward movement of the plate 222 out of the slideway 218. Each stop is hinged as at 255 so that it can be swung upwardly out of stopping position. A stop 256 carried by each of the slides 228 limits the normal movement of the plate 224 outwardly. Each stop is spring urged in known manner towards the slide which supports it, but can be moved outwardly to permit more plate movement. Each of the slideway assemblies 274 and 276 includes a wear resistant packing strip 280 contained in the compartment formed by the wall 278, the tie walls 279 extending between the throughway wall and wall 278 and the side of the throughway formed by the openings 212 and 216. The packing strip can be formed by any desired material but is preferably formed of braided or woven nylon or teflon filaments impregnated with graphite suspended in parafine. This makes a very long wearing and effective packing.

Placed against each wear resistant strip 280 is a relatively thick pressure creating strip 282 formed of sponge rubber or neoprene or or any other desired compressible resilient material or spring assembly.

A closure plate 284 is placed against each compression creating strip 282 and holds this strip in compressed state so as to place a controlled and uniformly distributed selected pressure on the wear resistant strip 280 and effectively prevent the passage of dust between strip 280 and the valve plate 222 or 224 at any time. Each of the closure plates 284 is fastened securely in closed position by suitable fasteners such as the latches 286 which are discs each formed with a flat 288 and a screw driver slot and is rotatably riveted to the closure plate 284. A closure plate can be placed in closed position by turning all of the fastener discs 286 so that the flat 288 lies along the edge of plate 284. Placing the plate in position against a compression strip 282 and compressing strip 282 until each disc is adjacent an opening in the wall 278 or the throughway wall as shown at 290 and then turning the discs into the position shown by the discs in FIG. 1 which will securely hold the plate 284 in closed position in which the stip 280 will be held in tight contact with its valve plate 222 or 224 and prevent passage of dust between the wear strip and valve plate.

The tops of the two end guideways shown at 291 are formed of removable plates 292 to facilitate thorough cleaning. The two plates 292 are also held securely in position by fastener discs 286.

OPERATION AND USE OF THE INVENTION

When the valve is to be closed air is admitted to the outer end of the air cylinder 234 which closes the larger plate 222 until it contacts the opposite side of the material throughway when it will stop which will cause the air cylinder and slides 228 to move to the right as viewed in FIG. 1 and close smaller plate 224 until it tightly contacts plate 222 and thereby closes off completely any dribble which might be passing between the edge of plate 222 and the wall of the material throughway.

When the valve is to be closed air is admitted to the inner end of air cylinder 234 and the reverse action takes place. The packing strips 280 pressing as they do on opposite sides of the gate plates 222 and 224 form a very complete seal which eliminates almost all build-up of material on the plates and the low frictional characteristics of both the plates and strips permits a long wear life but the strips 280 will eventually require replacement. This can be accomplished in a matter of minutes by unlocking the disc fasteners 286; lifting out the plates 284; the compression strips 282 and the wear strips 280 which will be replaced with new wear strips and the compression strips 282 and the cover plates 284 replaced and locked into position. This also a very economical replacement.

If desired, while the wear resistant strips 280 are out all of the frictionally active surfaces of the valve can be very effectively cleaned very quickly and easily. Thus, the air cylinder 234 will be vented at both ends by any desired simple valve means so that the internal piston can be moved by hand either direction. The stops 254 will be swung up out of the way and the plate 222 will be moved to the right as seen in FIG. 1 entirely out of the valve structure where the plate 222 and all sufaces within the valve structure can be brushed, lightly scraped, air blasted lightly or otherwise completely cleaned. The plate 222 can then be moved back into place and the smaller plate 224 completely removed to the left and likewise quikly cleaned along with all other surfaces subjected to sliding action. Stops 256 will be moved outwardly. The two cover plates will then be quickly removed and likewise cleaned along with the interior surfaces covered by the cover plates 292. After this the plates 224 will be replaced and the wear resistant strips, etc. replaced as above described. All of this maintainance procedure requires only a few minutes.

Although the sealing and cleaning facilities of the present invention have been disclosed as applied to a dribble-free valve, it is to be understood that these inventive features can also be applied to any type of plate valve.

A hand lever system may be used instead of the air cylinder if desired as described in the above mentioned patent.

The discs 286 provide quick release fasteners for the plates they are attached to.

The valve plates 222 and 224 float between the packings 280 on opposite sides thereof.

The invention having been described, what is claimed is:

1. A quickly cleanable and maintainable flow control gate valve comprising a homogenous body having a throughway opening therein for passage of the material being controlled through said valve body, a wall extending along but spaced from said body, tie-walls extending between said wall and and said body to support said wall and forming therewith a compartment open in its entire area both top and bottom, said wall and body having parallel and aligned slots extending therethrough which form a slideway into said throughway, a valve plate slidable in said slideway and across said compartment and throughway, a wear resistant and sealing packing in said compartment and in contact with said plate on one side thereof, a quickly removable closure plate for closing said compartment which is separate from any other part of the valve and freely accessible, quick release fasteners for retaining said closure plate in said compartment, and a compressible resilient material interposed between said closure plate and said wear resistant packing to press said packing against said valve plate under controlled sealing pressure, whereby said compartment can be cleared completely for thorough cleaning of all movement related areas and parts replacement where required in a minimum of time.

2. A gate valve as specified in claim 1 in which a quickly releasable stop is provided to limit the outward movement of said valve plate and when released enables said valve plate to be completely removed from said slideway for thorough cleaning.

3. A gate valve as specified in claim 1 in which a compartment opens into said slideway on the opposite side thereof from said frist named compartment, a wear resistant and sealing packing in said last named compartment and in contact with said valve plate on the opposite side from said first named packing, a closure plate for said last named compartment, and a compressible resilient material interposed between said last named packing and said last named closure plate whereby said valve plate floats between said packings.

* * * * *